A. & B. KENT.
INDICATORS FOR SPECTACLES.

No. 193,660. Patented July 31, 1877.

Witnesses.
L. Whitehead
H. H. Warren

Inventor:
A. Kent
B. Kent
by Ridout, Bird & Keo
attys

UNITED STATES PATENT OFFICE.

AMBROSE KENT AND BENJAMIN KENT, OF TORONTO, ONTARIO, CANADA.

IMPROVEMENT IN INDICATORS FOR SPECTACLES.

Specification forming part of Letters Patent No. 193,660, dated July 31, 1877; application filed May 22, 1877.

*To all whom it may concern:*

Be it known that we, AMBROSE KENT and BENJAMIN KENT, both of the city of Toronto, in the county of York, in the Province of Ontario, Canada, opticians, have invented a new and useful Instrument for Indicating the Number of Glass Required for Various Sights, which improvement is fully set forth in the following specification and accompanying drawings.

The object of our invention is to provide an instrument by which opticians and others engaged in the trade can determine with accuracy and dispatch the correct glass to suit each and every sight they may be called upon to fit with spectacles; and it consists in a tube of convenient length, open at one end, the other end being closed by an adjustable stopper, acting through a collar upon the spindle of a disk or ball placed within the said tube, and having stamped or otherwise printed upon its periphery a number of letters, graduated in size from a small letter discernible only to those possessed of fair sight, to a larger one, visible to defective vision. Upon the same spindle as this lettered disk is fixed an index-disk, having stamped upon its periphery certain figures indicating, when opposite a pointer-plate, the strength of the glasses which the size of the letter at that time seen through the tube calls for, as here inafter more particularly described.

Figure 3:
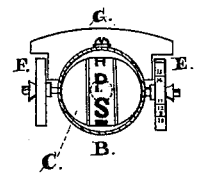
Figure 1:
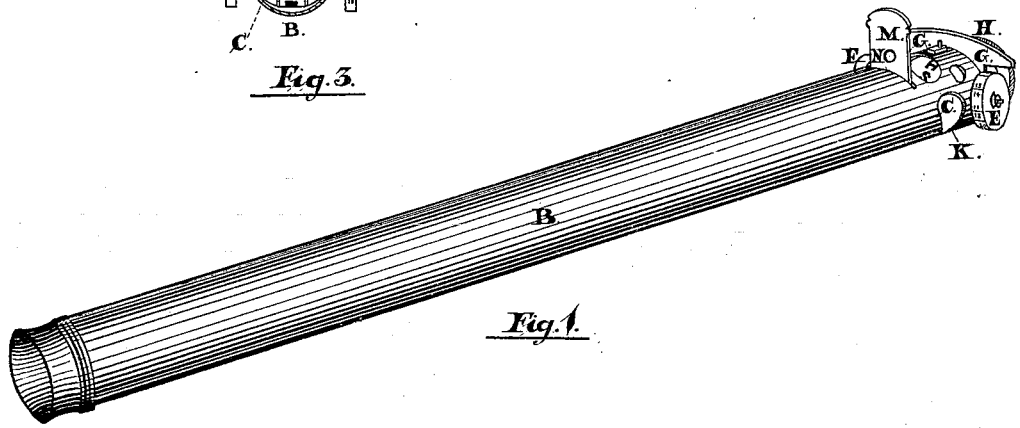
Figure 2:

Figure 1 is a perspective view of our tube. Fig. 2 is a sectional plan. Fig. 3 is a detail.

In the drawing like letters indicate corresponding parts in each figure.

B is the tube, which may be of any suitable size; but we think that one inch and a quarter in diameter and sixteen inches in length will be found to be suitable dimensions.

C is a ball or disk, carried within the tube, as represented, upon the spindle D, to which spindle the disks E and F are also fastened.

G is a bridge, which serves as a pointer-plate, as hereinafter described.

H is a cap screwed upon the end of the tube B, and, while serving as a stopper thereto, also acts upon the collar I, causing it to press against the spindle D, so as to tighten it within its slotted bearings in the said tube B.

Around the periphery of the ball C we print a number of letters, preferably black, upon a white ground, graduated in size, as hereinbefore mentioned, and upon the periphery of one or both of the disks E F we stamp numbers corresponding with those known to the trade as indicating glasses of certain strengths.

In order to admit light within the tube B, we pierce one or more holes, K, through it, immediately in front of the ball C, and with the view of directing the sight upon the letters on the said ball, we place a partition, L, in the tube B, having a hole in its center sufficiently large to permit the largest letter on the ball C to be seen. Upon the partition L we affix a slide, M, which can be drawn out of the tube B, as shown in Fig. 1, where the large letters are to be looked at; but when the smaller letters are to be inspected it is pushed in till it covers the hole in L, the small hole N in the slide M being then the sight-hole.

It will be noticed that no magnifiers or glasses of any kind are used in our instrument, and it is merely necessary for the party for whom the glasses are to be chosen to place his eye to the open end of the tube B, when, by turning the spindle D till the smallest letter he can see becomes visible, the number at that time opposite to the bridge or pointer-plate will indicate the number of the glasses required by the sight being thus tested.

What we claim as our invention is—

1. A ball or disk, C, carried upon the spindle D within the tube B, and having letters painted or otherwise upon its periphery, as described, in combination with the numbered disk E and pointer-plate G, as and for the purpose specified.

2. The pierced partition L and slide M, provided with a hole, N, and fitting into the tube B, as described, in combination with the ball or disk C, having on its periphery letters or figures graduated from small to large, as and for the purpose specified.

3. The tube B, provided with holes K, in combination with the lettered disk or ball C, as and for the purpose specified.

4. The spindle D, carrying the disks C, E, and F, and fitting into a slot on one end of the tube B, in combination with the collar I and screwed cap H, as and for the purpose specified.

AMBROSE KENT.
BENJAMIN KENT.

Witnesses:
E. M. TROWERN,
WILLIAM HORTON.